US006452990B1

(12) United States Patent
Leis et al.

(10) Patent No.: US 6,452,990 B1
(45) Date of Patent: *Sep. 17, 2002

(54) SYNCHRONOUS DETECTION OF WIDE BI-PHASE CODED SERVO INFORMATION FOR DISK DRIVE

(75) Inventors: Michael D. Leis, Framingham; Ara Patapoutian, Westboro; Mathew P. Vea, Shrewsbury, all of MA (US); Richard M. Ehrlich, Saratoga, CA (US); Kevin D. Fisher, Palo Alto, CA (US); James A. Henson; William R. Akin, Jr., both of Morgan Hill, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/239,036

(22) Filed: Jan. 27, 1999

Related U.S. Application Data

(60) Division of application No. 08/724,977, filed on Oct. 3, 1996, which is a continuation-in-part of application No. 08/320,540, filed on Oct. 12, 1994, and a continuation-in-part of application No. 08/686,998, filed on Jul. 24, 1996, now Pat. No. 5,661,760.
(60) Provisional application No. 60/006,013, filed on Oct. 23, 1995.

(51) Int. Cl.⁷ ................................................ H04L 7/02
(52) U.S. Cl. ....................... 375/361; 375/359; 375/360; 360/27; 369/43
(58) Field of Search ................................. 375/354, 361, 375/359, 360, 368, 362; 360/27, 29, 42, 46, 48, 51, 77.08, 78.09; 369/43, 44.26, 44.29, 44.34, 44.35

(56) References Cited

U.S. PATENT DOCUMENTS

| 5,170,299 A | * | 12/1992 | Moon ...................... 360/77.08 |
| 5,341,249 A | * | 8/1994 | Abbott et al. ................. 360/46 |
| 5,341,387 A | * | 8/1994 | Nguyen ...................... 714/788 |
| 5,345,342 A | * | 9/1994 | Abbott et al. ................. 360/48 |
| 5,384,671 A | * | 1/1995 | Fisher ......................... 360/51 |
| 5,420,730 A | * | 5/1995 | Moon et al. ............. 360/77.08 |
| 5,422,760 A | * | 6/1995 | Abbott et al. ................. 360/46 |
| 5,477,516 A | * | 12/1995 | Takezawa .................... 369/48 |
| 5,521,945 A | * | 5/1996 | Knudson .................... 375/341 |
| 5,576,906 A | * | 11/1996 | Fisher et al. ............. 360/77.08 |
| 5,661,760 A | * | 8/1997 | Patapoutian et al. ........ 375/341 |
| 5,862,005 A | * | 1/1999 | Leis et al. .................... 360/27 |
| 6,288,860 B1 | * | 9/2001 | Buch .......................... 360/48 |

\* cited by examiner

*Primary Examiner*—Phuong Phu

(57) ABSTRACT

A magnetic disk drive data storage disk defines recording tracks divided into data sectors by narrow servo spokes. A data sector lying between servo spokes is recorded with user data encoded in accordance with a code having a predetermined distance and user data code rate. Each servo spoke of the recording area has at least one servo information field encoded in a wide bi-phase code pattern. The disk drive further includes a synchronous sampling data detection channel having a data transducer head positioned by a servo-controlled actuator over the recording track, a preamplifier for receiving electrical analog signals magnetically induced by the data transducer head from flux transitions present in at least the servo information field, a digital sampler for synchronously sampling the electrical analog signals to produce digital samples, and wide bi-phase decoding circuitry coupled to receive digital samples from the synchronous sampling data detection channel for decoding the wide bi-phase code pattern.

24 Claims, 12 Drawing Sheets

A1 ECC(A1) A0 ECC(A0)
A1 ECC(A1) A2 ECC(A2)
A3 ECC(A3) A2 ECC(A2)
A3 ECC(A3) A4 ECC(A4)
A5 ECC(A5) A4 ECC(A4)
A5 ECC(A5) A6 ECC(A6)
A7 ECC(A7) A6 ECC(A6)
A7 ECC(A7) A8 ECC(A8)

radial direction

SYNCHRONOUS DETECTION OF WIDE BI-PHASE CODED SERVO INFORMATION FOR DISK DRIVE

CROSS REFERENCE TO RELATED APPLICATIONS

This application is a divisional application of U.S. patent application Ser. No. 08/724,977, filed Oct. 3, 1996, which claims the benefit of U.S. Provisional Application No. 60/006013 filed Oct. 23, 1995, and which is a continuation-in-part of, and claims the benefit of, U.S. patent application Ser. No. 08/320,540 filed Oct. 12, 1994, and U.S. patent application Ser. No. 08/686,998 filed on Jul. 24, 1996, now U.S. Pat. No. 5,661,760.

FIELD OF THE INVENTION

The present invention relates to apparatus and methods for storing, detecting, and synchronously detecting servo information stored on disk drive media, and in particular to apparatus and methods useful within partial response, maximum likelihood detection channels and magnetic disk media.

BACKGROUND OF THE INVENTION

By reading servo information recorded within data tracks on a disk surface, a disk drive head positioner servo system is able to estimate data transducer head position. The recorded servo information typically includes track (i.e. cylinder and head) addresses and servo bursts. Each circumferential data track on a disk surface has a unique track address, which is recorded in servo sectors embedded in the track, and servo burst patterns frequently repeat every two or more tracks. When a disk drive is seeking to a radial track location, the track addresses are used as coarse positioning information to approximately estimate the position of the read head and the servo bursts are used as fine positioning information to position the head precisely on the desired radial location.

At seek time while reading track addresses, the head may be positioned between two adjacent tracks. In this situation, the head may receive a superposition of signals from both tracks. One solution to this ambiguity is to encode the track addresses into Gray-coded addresses so that the encoded addresses of any two adjacent tracks differ from each other by only in a single bit position. With this solution, when the head is reading between two tracks, the ambiguity after decoding the address is one track, and an error of one track can be resolved during seek settle time, by reference to the servo burst or fine-position pattern.

In accordance with one known technique, each data track is divided into plural sectors. Each sector includes a header section, followed by a data section. The header section may typically include a DC erase field, a preamble field, a header synchronization character, a track address field (coarse servo information) and a servo burst field (fine servo information). The data section may typically include another preamble field, a data synchronization character, a block of user data, and error correction bytes. In this example, the header section is recorded at the same data rate as the data section, and synchronous peak detection through a single read channel structure in the disk drive is employed to read the information in both the header section and the data section. An example of this approach is found in commonly assigned U.S. Pat. No. 5,036,408 to Leis et al., entitled: "High Efficiency Disk Format and Synchronization System", the disclosure thereof being incorporated herein by reference.

Another known technique is to employ radial zones or bands of concentric data tracks, each zone having a data transfer rate associated with disk radius of the zone. In this example, data areas are separated by a series of radially extending embedded servo sectors which are factory recorded with servo information at a single data transfer rate. A servo data recovery circuit asynchronously (i.e. without phase lock to incoming servo data) recovers a servo address mark, a track number and fine position information from information read by the data transducer while passing over each sector. The servo recovery circuit is separate from the read channel electronics employed for peak detection of user data information. This example is described in commonly assigned U.S. Pat. No. 5,420,730 to Moon, et al., entitled: "Servo Data Recovery Circuit for Disk Drive Having Digital Embedded Sector Servo", the disclosure thereof being incorporated herein by reference.

One factor which has limited data storage densities in magnetic recording employing peak detection techniques has been intersymbol interference, arising when flux transitions are increasingly close to each other. One technique for increasing flux densities in magnetic recording while still accurately reading recorded data is to employ synchronous sampling data detection. This technique, frequently referred to as "partial response, maximum likelihood" (PRML) signaling, has provided some improved data storage densities, at the expense of increased circuit complexity, including a fast analog to digital conversion process, and channel equalization, either on the analog side or on the digital side of the signal stream, or both. An example of a disk drive employing PRML is given in commonly assigned U.S. Pat. No. 5,345,342, to Abbott et al., entitled: "Disk Drive Using PRML Synchronous Sampling Data Detection and Asynchronous Detection of Sector Servo", the disclosure thereof being incorporated herein by reference. The approach described in this patent enabled special circuitry within the synchronous sampling data detection channel to asynchronously detect track number values in embedded servo sectors recorded at a constant servo data rate whereas the user data rate differed by radial data zone across the recording disk. The servo bursts were read and processed using conventional peak detection, and sample and hold techniques.

An improvement over the asynchronous servo sampling technique taught by the Abbott et al. patent referred to above is found in a later, commonly assigned U.S. Pat. No. 5,384,671 to Fisher, entitled: "PRML Sampled Data Channel Synchronous Servo Detector", the disclosure thereof being incorporated herein by reference. In this approach a timing loop of the synchronous sampling data detection system is phase locked to servo information, the servo information including track address and fine position information is synchronously sampled and decoded. In this approach the servo preamble field is recorded as a conventional ¼T sine wave pattern, which corresponds to a 2T pattern in a peak detection channel (T representing a unit sample cell or interval).

While these prior approaches have worked well in their respective times, increasing data storage capacities and data transfer rates per unit size disk have led directly to a hitherto unsolved need for an improved disk drive head servo format and synchronous sampling servo detection method and architecture.

SUMMARY OF THE INVENTION WITH OBJECTS

A general object of the present invention is to provide improved and simplified methods, apparatus, and data format for providing information for positioning data transducer heads relative to data tracks in a disk drive including a partial response, maximum likelihood (PRML) synchronous sampling data detection channel.

Another object of the present invention is to provide a servo format and apparatus for a PRML disk drive which does not require separate peak-detection hardware for detecting embedded servo information.

Yet another object of the present invention is to reduce impact of radial incoherence upon a head position servo system of a disk drive thereby facilitating higher track densities in a manner overcoming limitations and drawbacks of the prior art.

A further object of the present invention is to provide a synchronous sampling servo information estimation method and apparatus which makes substantial use of circuit elements of a PRML synchronous sampling data detection channel, thereby reducing overall circuit complexity and cost while providing for robust recovery of the servo information.

A further object of the present invention is to provide a simplified address decoding method and apparatus within a PRML sampling data detection disk drive.

One more object of the present invention is to provide a more compact and higher efficiency servo address format enabling use of higher code rates, smaller cell times and less redundancy within embedded servo sectors which are synchronously sampled and detected within a PRML disk drive.

Yet another object of the present invention is to employ a species of bi-phase self-clocking code, known as "wide bi-phase code" for encoding head position servo information recorded within embedded servo sectors on a storage disk surface of a disk drive including a PRML synchronous sampling data detection channel, in a manner facilitating use of many channel elements during servo information recovery operations.

Still one more object of the present invention is to provide a most-significant-bit (MSB) detector for detecting wide bi-phase encoded head position servo information within a PRML synchronous sampling data detection channel of a hard disk drive.

Yet one more object of the present invention is to provide a plurality of servo burst detection architectures for detecting antipodal and frequency modulated servo burst patterns in order to produce head position error signals within a hard disk drive including a synchronous sampling data detection channel.

In accordance with principles of the present invention, a magnetic disk drive has at least one rotating magnetic data storage disk defining recording tracks divided into data sectors by narrow servo spokes. A data sector lying between servo spokes of a recording track on the disk is recorded with user data encoded in accordance with a code having a predetermined distance and user data code rate. Each servo spoke of the recording area has at least one servo information field encoded in a wide bi-phase pattern at a servo code rate which is selected to be reliably robust in view of the synchronously detected data code rate. The disk drive further includes a synchronous sampling data detection channel for synchronously sampling and detecting both the servo information field and the coded user data. The detection channel includes:

a data transducer head positioned by a servo-controlled head positioner over the recording track, a preamplifier for receiving electrical analog signals magnetically induced by the data transducer head from flux transitions present in at least the servo information field, a digital sampler for synchronously sampling the electrical analog signals to produce digital samples, and wide bi-phase decoding circuitry including a most significant bit detector coupled to receive digital samples from the synchronous sampling data detection channel for decoding the coded wide bi-phase pattern.

In one aspect of the present invention, the data detection channel includes a chunk synchronizer for generating and applying a wide bi-phase synchronization signal to the most significant bit detector.

In another aspect of the present invention, the wide bi-phase magnet patterns recorded in plural servo information fields of each spoke are ++−− for a binary zero information value and −−++ for a binary one information value.

In another aspect of the present invention, one servo information field within each spoke comprises a track number binary pattern of predetermined bit length, the pattern being decoded as a wide bi-phase code and then decoded as a Gray code with a code rate of one. Also, the track number binary pattern may include a parity or cyclic redundancy check (CRC) symbol, and has circuitry for receiving and decoding the track number binary pattern and for checking the parity or CRC symbol.

In a further aspect of the present invention, one servo information field within each spoke comprises two track number binary patterns of predetermined bit length: a first track number being an address of the track, and a second track number being an address of a second track adjacent the track. In this aspect, the second track number may be recorded with a one-half track offset extending into the second track, and it may further include error correction code values calculated with respect to the first and second track numbers. In this aspect, error correction code decoding and correcting circuitry is coupled to the synchronous sampling data detection channel for decoding, checking and correcting the decoded values of the first and second track numbers.

As another facet of the present invention, a data recording disk has a pattern of radially spaced tracks and a plurality of circumferentially spaced angular servo sectors lying in data sectors. The servo sectors include prerecorded servo head positioning information for identifying track and sector locations, each of the servo sectors having at least one identification field including servo symbols encoded in accordance with a wide bi-phase code. Each of the data sectors is recorded with data symbols in accordance with a maximum distance code such that the servo symbols and the data symbols may be detected by passage through a single synchronous sampling data detection channel, such as a PRML channel, with which the disk is physically assembled and used.

These and other objects, advantages, aspects and features of the present invention will be more fully understood and appreciated upon consideration of the following detailed description of a preferred embodiment, presented in conjunction with the accompanying drawings.

DETAILED DESCRIPTION OF PREFERRED EMBODIMENTS

Figure 1:
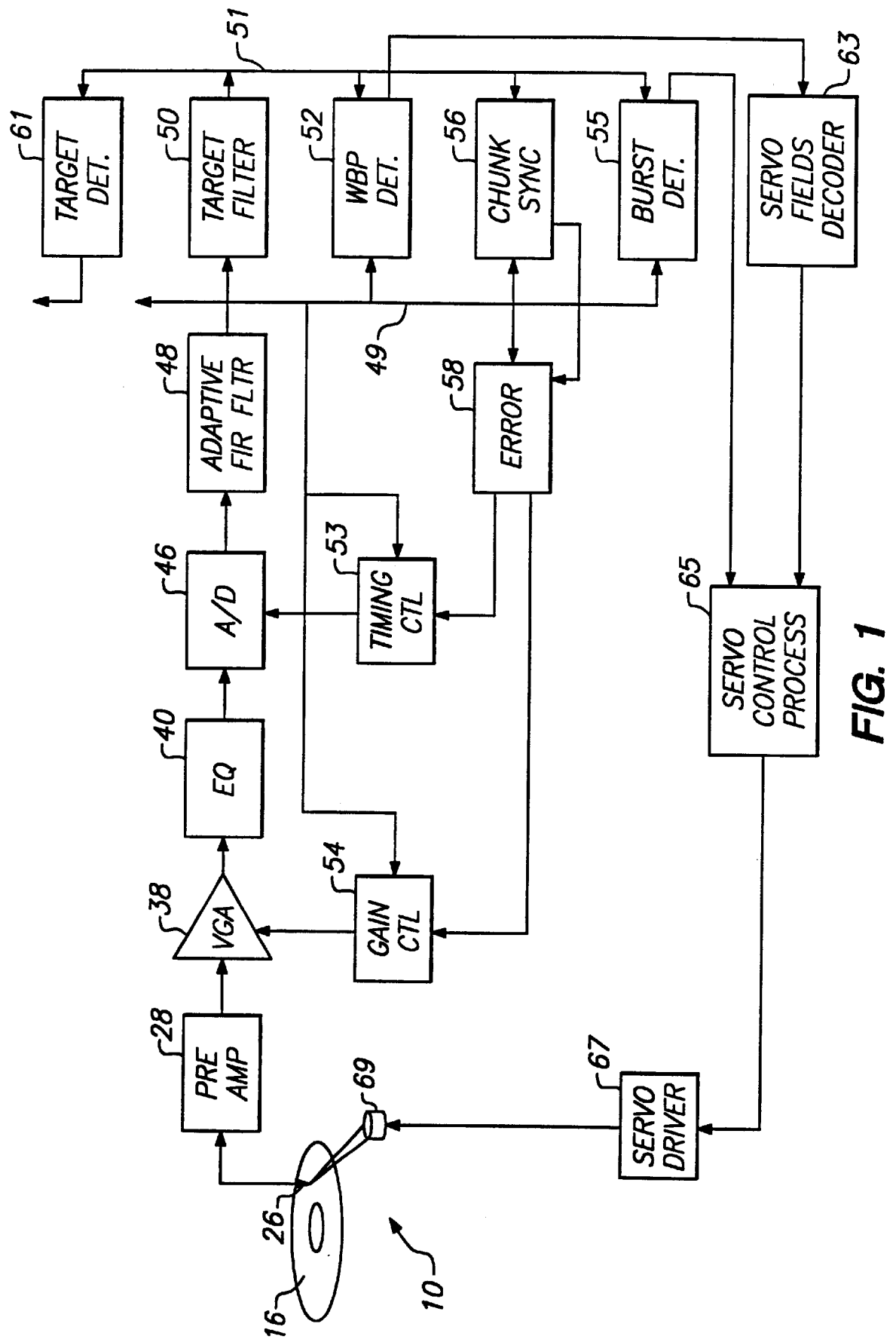
FIG. 1 is a block diagram of a disk drive read channel providing PR4 and EPR4 targets.

Turning to FIG. 1, a disk drive 10 incorporates a programmable and adaptive PR4, ML read channel. The disk drive 10 may be one of a variety of embodiments, such as that disclosed in commonly assigned U.S. Pat. No. 5,341,249 to Abbott et al., entitled: "Disk Drive Using PRML Class IV Sampling Data Detection with Digital Adaptive Equalization", the disclosure thereof being incorporated herein by reference. (This patent is the parent of the Abbott et al. U.S. Pat. No. 5,345,342, referenced hereinabove.)

The drive 10 includes at least one data storage disk 16. As is conventional, a data transducer head 26, for example, a magneto-resistive head, is associated in a "flying" relationship over a storage surface of each disk 16. The head 26 is positioned relative to selected ones of a multiplicity of concentric data storage tracks 71 defined on each storage surface of the rotating disk 16, see FIG. 2.

Figure 2:
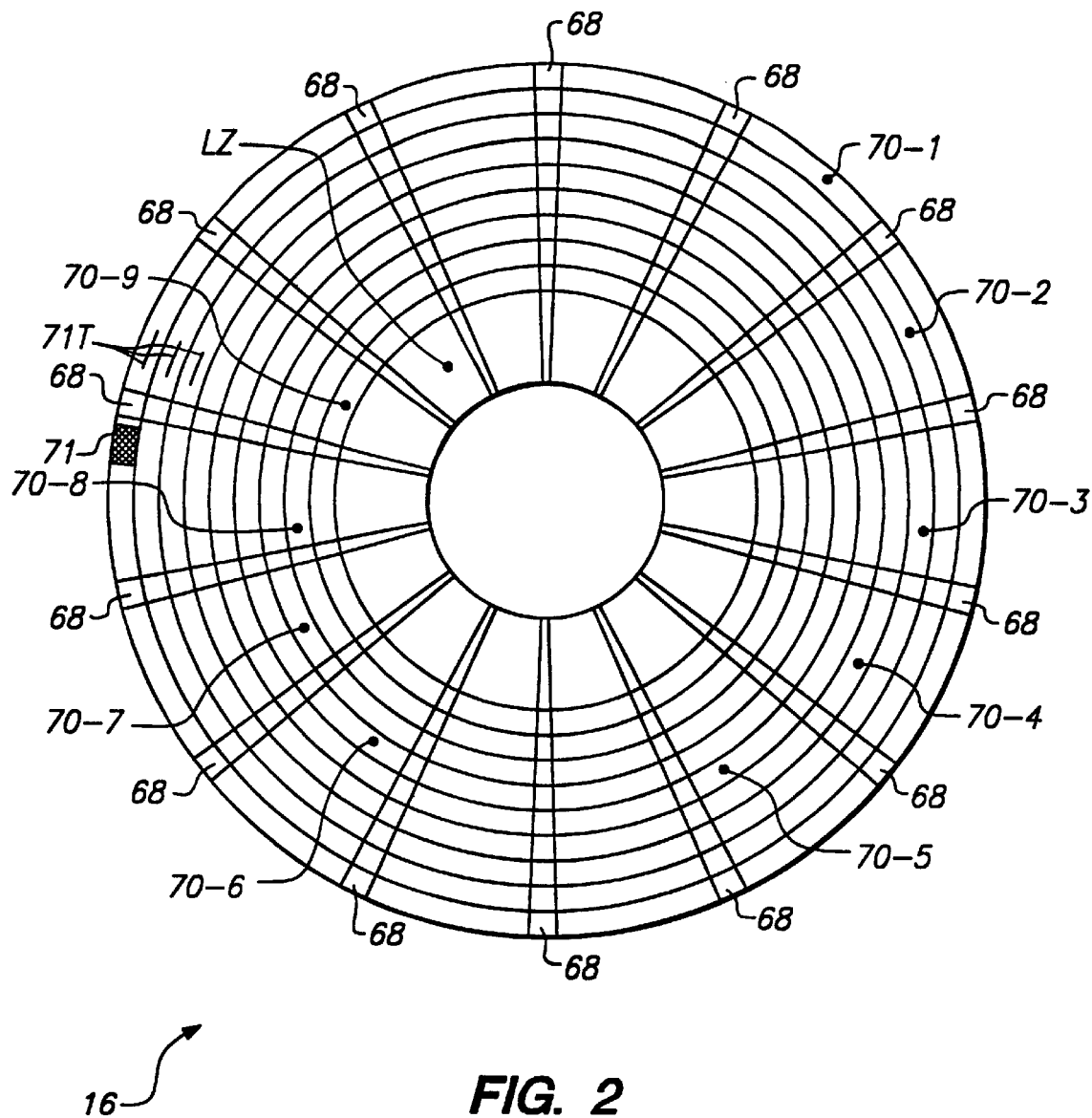
FIG. 2 is a schematic diagram of a recording surface of a disk in the disk drive.

Embedded servo patterns are written in a conventional servo writing process during drive manufacturing on selected data storage surfaces of the disk 16, see FIG. 2, for example, in accordance with the methods described in a commonly assigned U.S. Pat. No. 5,170,299, the disclosure of which is incorporated here by this reference. Alternatively, the drive 10 may self-write some or all of its servo patterns during a post-assembly servo writing process.

During reading, flux transitions sensed by head 26 as it flies in close proximity over the selected data track 71 are preamplified by a read preamplifier circuit 28. The preamplified analog signal (or "read signal") is then sent into an analog variable gain amplifier (VGA) 38. After controlled amplification, the read signal is then passed through a programmable analog filter/equalizer stage 40.

The analog filter/equalizer 40 is programmed so that it is optimized for the data transfer rate of the selected data zone 70 from within which the transducer head 26 is reading data. The equalized analog read signal is then subjected to sampling and quantization within a high speed analog to digital (A/D) converter 46 which, when synchronized to user data, generates raw data samples {x(k)} of at least five bits resolution.

An adaptive digital FIR filter 48 employs adaptive filter coefficients for filtering and conditioning the raw data samples {x(k)} in accordance with the desired PR4 channel response characteristics in order to produce filtered and conditioned samples {y(k)}. The bandpass filtered and conditioned data samples {y(k)} from FIR filter 48 are then passed over a data bus path 49 to a Viterbi detector (not shown), which detects user data with the PR4 target. In those embodiments using both a PR4 and an EPR4 target, the filtered and conditioned samples {y(k)} from FIR filter 48 are also passed through a target (e.g. 1+D) filter 50, the output path 51 of which provides the signal filtered to e.g. EPR4 channel response characteristics. Other targets than PR4 and EPR4 are within the contemplation of this invention, and the target filter 50 would be adapted to the selected target. (If only a single PR4 or EPR4 target spectrum is desired, FIR filter 48 is programmed with appropriate coefficients directly, and a second target filter 50 is not needed.) The samples, including raw data samples {x(k)} and filtered samples {y(k)}, are taken at the data sampling rate, which has a clock bit time period T. This time T corresponds to a "bit cell" or, more simply, a "cell", at the sampling rate. A timing loop 53 may receive e.g. the PR4 target samples on path 49 and synchronize sampling and quantization by the analog to A/D converter 46 at desired sampling locations. Similarly, a gain loop 54 may control the VGA 38 based e.g. on error values produced by an error measurement circuit 58 connected to receive the e.g. PR4 target samples on path 49. A DC offset control loop (not shown in FIG. 1) may also be provided to adjust for DC offset based on the PR4 target samples. A target detector 61, which may include a path memory, such as a Viterbi detector, or a complexity-reduced target post-processor of the type described in commonly assigned U.S. Pat. No. 5,521,945 to Knudson, entitled: "Reduced Complexity EPR4 Post-Processor for Sampled Data Detection", the disclosure thereof being incorporated herein by reference thereto.

The drive 10 also includes a wide bi-phase detector 52 for detecting wide bi-phase encoded servo information symbols, in accordance with framing patterns generated by a chunk synchronizer 56. The detector 52 and synchronizer 56 may receive servo symbol sample values on the path 49, or the path 51. The circuit also includes a synchronous burst detector 55 which likewise receives sample values either from path 49 or path 51. A conventional servo fields decoder 63 receives, frames and decodes servo symbols from servo fields decoded by the wide bi-phase detector 52, and may follow the approach shown in commonly assigned U.S. Pat. No. 5,420,730 to Moon et al., entitled: "Servo Data Recovery Circuit for Disk Drive Having Digital Embedded Sector Servo", the disclosure thereof being incorporated herein by reference. Position error signals (PES) from the burst detector 55 and servo field information from the decoder 63 enter a servo control process circuit 65 wherein actuator current command values are generated. These values are applied to a head position servo driver circuit 57 and resultant driving currents are supplied to drive a voice coil motor (VCM) 69 which positions the head 26.

Ideally, some or all of the elements 38, 40, 46, 48, 50, 52, 53, 54, 55, 56, 58, and 63 may be included in one mixed-mode application-specific integrated circuits (ASICs), or in several analog/digital ASICs.

As shown in FIG. 2, an exemplary data storage surface of a storage disk 16 has multiple concentric data tracks 71 which are preferably arranged in a plurality of data recording zones 70 between an inner landing zone area LZ and a radially outermost peripheral data track zone 70-1. In the illustrated example, the data tracks are shown as arranged into e.g. nine data zones including the outermost zone 70-1, and radially inward zones 70-2, 70-3, 70-4, 70-5, 70-6, 70-7, 70-8 and 70-9, for example. In practice, more zones are presently preferred. Each data zone has a bit transfer rate selected to optimize areal transition domain densities for the particular radius of the zone.

Figure 3:
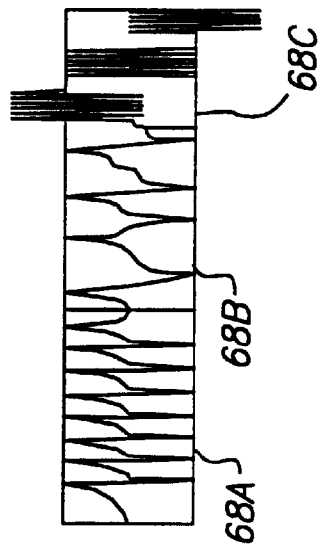
FIG. 3 illustrates a signal recorded on a servo sector on a track of the disk.

FIG. 2 also depicts a series of radially extending embedded servo sectors or "spokes" 68 which e.g. are substantially equally spaced around the circumference of the disk 16. While the FIG. 2 depiction illustrates the servo spokes 68 as generally trapezoidal, in practice the servo wedges are slightly curved along the disk radial dimension. By way of the FIG. 3 overview, each servo sector 68 essentially includes a servo preamble field 68A, a servo identification field 68B, and a field 68C of circumferentially staggered, radially offset servo bursts, for example. While the number of data sectors per track varies from data zone to data zone, the number of embedded servo sectors, e.g. 68 per track, remains constant throughout the surface area of the disk 16, in the present example.

The servo sectors 68 are preferably recorded at a single data cell rate and with phase coherency from track to track with a conventional servo writing apparatus at the factory. Servo writing may be conventionally carried out by a laser servo writer and head arm fixture as described for example in commonly assigned U.S. Pat. No. 4,920,442, the disclosure of which is incorporated here by this reference. Alternatively, the servo sectors are written at zoned data cell rates, as described in commonly assigned U.S. Pat. No. 5,384,671, already discussed above. The disk drive may alternatively employ partial or complete "self servo write" techniques in order to carry out servo writing.

Figure 4:
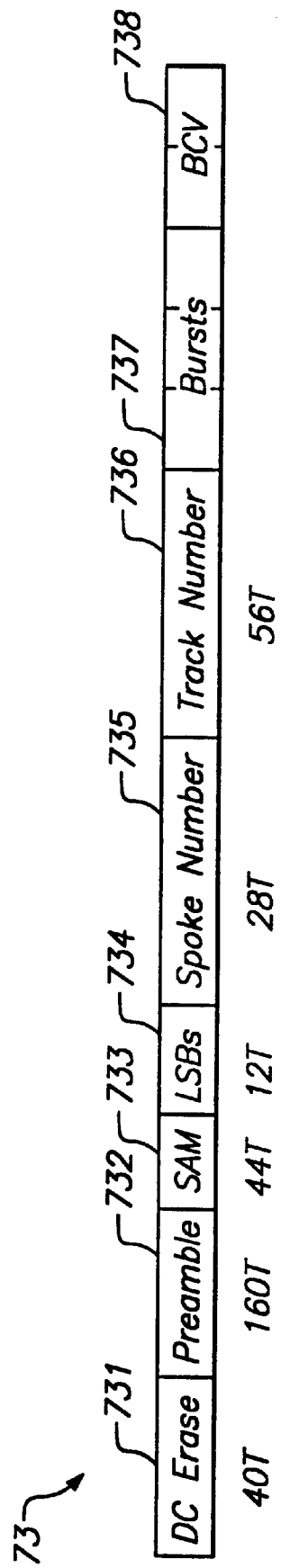
FIG. 4 is a block diagram of the fields of the servo sector.

Turning to FIG. 4, each servo sector 68 or "spoke" has a servo identification field of embedded servo information such as is illustrated, for example. A optional DC erase field 731 of size e.g. 40 cells (illustrated in FIG. 4 with the time "40T" below the field) in a clean area on the disk with substantially no or a few transitions, which can be used to flag the onset of a servo sector 68. A preamble field 732 of size e.g. 160 cells can be written in a 2T repeating pattern such as "--++ --++ --++" of the desired length. The preamble 732 is used by timing and gain loops to establish correct gain and phase lock relative to the incoming analog signal thereby to control sampling quantization by the analog to digital converter 46. Together, the optional DC erase field 731 and the preamble field 732 comprise the preamble field 68A of FIG. 3.

A servo address mark 733 is used to reset the framing clock. This is followed by the e.g. three least significant bits (LSBs) 734 of the track number. The full spoke number 735 is optional, although at least one bit of information should be provided to enable rotational position to be determined. The entire track number 736 is recorded at least once. The head number (not shown) may also be recorded as part of the servo addressing information. Together, the servo address mark 733, the LSB field 734, full spoke number field 735 comprise the servo identification field 68B of FIG. 3.

Following the addressing information, servo bursts 737 are recorded, which are used to determine head position with respect to track center, as will be described. Examples of a variety of servo patterns are given hereinafter. These patterns in field 737 correlate to the field 68C of FIG. 3. The lengths of some or all the fields of the servo sector 68 may be of programmable size. Other fields of information may also be recorded among or after the fields that have been described. For example, the drive may record servo burst correction values (BCVs) in a short field 738 located immediately after the last servo burst pattern 737, as taught in commonly assigned, copending U.S. patent application Ser. No. 08/607,507 filed on Feb. 27, 1996, by Shepherd et al., entitled: "In-Drive Correction of Servo Pattern Errors", the disclosure thereof being incorporated herein by reference.

We turn now to describe wide bi-phase encoding, which may be used for some or all of the digital data storing fields of servo sector 68, such as the servo address mark 733, LSB field 734, spoke number field 735 and track number field 736, for example. In writing digital data, one begins with an unencoded bit (that is, either a 0 or a 1), which is referred to as a symbol. Symbols are recorded on a disk by a coding that assigns one or more signs or magnets (+ or −) to a cell. (Somewhat ambiguously, the signs may also be referred to as being either 0 or 1.) In bi-phase code (a self-clocking code also known in the art as Manchester, frequency doubling, or frequency modulation code) two signs are used, and symbols may be encoded as follows:

1→+−
0→−+

We define a wide bi-phase (WBP) code, with code rate ¼, as follows:

0→++−−
1→−−++

The DC erase field 731, which should have no flux transitions, cannot be WBP encoded.

The preamble field 732 may be WBP encoded with e.g. 40, or a programmable number of, WBP symbols '1' (or cells "−−++"), for PLL and AGC lock.

The servo address mark ("SAM") 733 may be a nine-symbol word '000100101' encoded in WBP that marks the beginning of a servo block. This SAM has the property that all shifts (auto correlation) disagree in at least 5 positions and therefore allows for 2 independent errors without loss of synchronization. When appended to the preamble 732 just described, the sequence looks like ' . . . 1111111000100101'. This is a modified Barker sequence.

The track number 736 may be a 14 symbol address or larger that is first encoded with a normal Gray code (with code-rate=1) and then a parity symbol may be added. The result is WBP encoded. The parity symbol, if any, cannot be used at seek time but can be used at read time to detect single errors. Gray coding is used to avoid large errors when simultaneously reading two adjacent track addresses when the read head 26 is between tracks during track seeking operations.

Figure 5A:
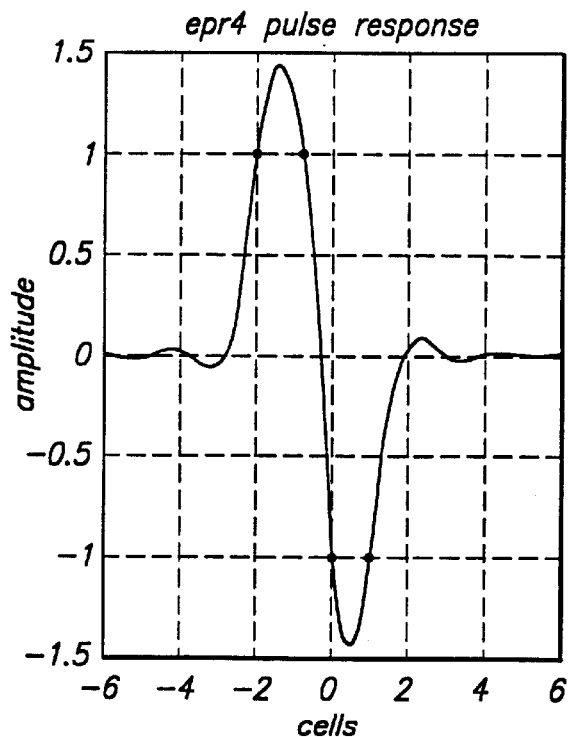
FIG. 5A is a graph of an analog signal response from a magnetic recording of a single write current pulse wherein the channel has been equalized to an EPR4 target spectrum.
Figure 5B:
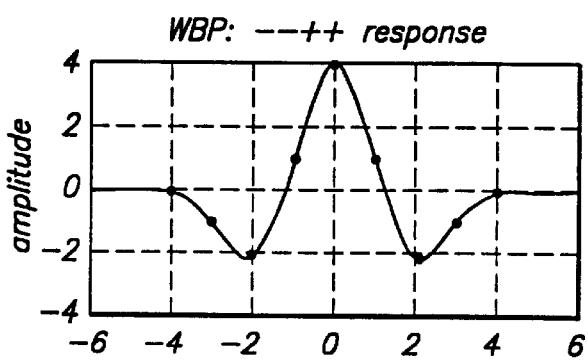
FIG. 5B is a graph of an analog signal response to e.g. a binary one ("−−++") wide bi-phase write current sequence.
Figure 5C:
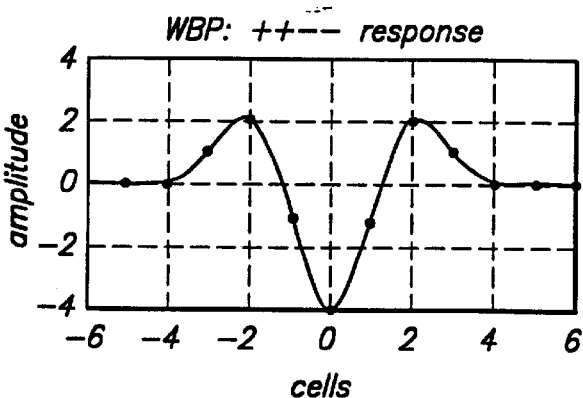
FIG. 5C is a graph of an analog signal response to e.g. a binary zero ("++−−") wide bi-phase write current sequence.
Figures 5D, 6A:
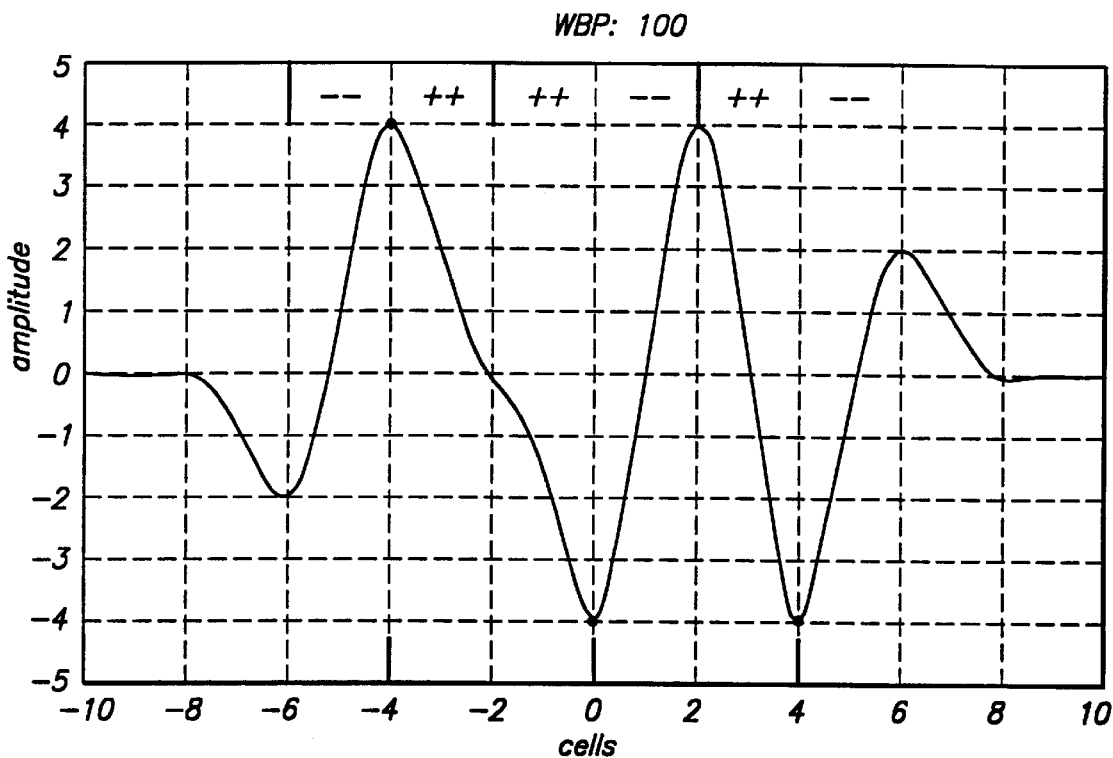
FIG. 5D is a graph of an analog signal response to a wide bi-phase sequence e.g. a binary 100 sequence ("−−++++−−++−−")
FIG. 6A illustrates a first servo sector layout for track numbers without radial interference.
Figure 6B:
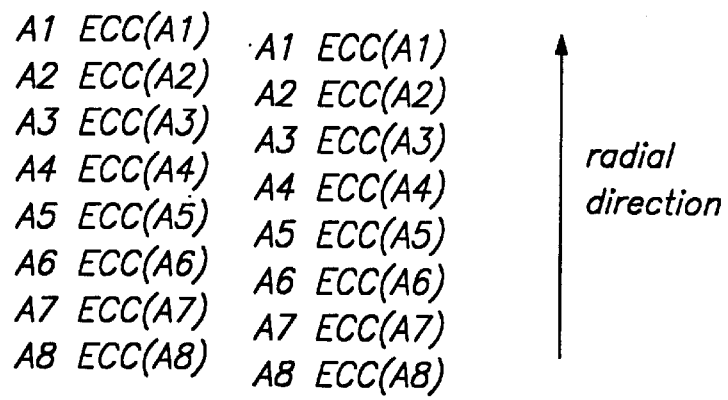
FIG. 6B illustrates a second servo sector layout for track numbers without radial interference.

In an alternative servo sector layout, track addresses (track numbers) are written twice in each servo sector 68, and the paired track addresses are different from each other. In FIG. 6A, odd track addresses (A1, A3, A5, A7) are written first and even track addresses (A2, A4, A6, A8) are written second, in what appear as radial columns in the figure. In FIG. 6B, the second column records the same track number as does the first, but the second column is recorded with a half-track offset. In both formats, during track following every position of the read head 26 can read an address without interference from an adjacent track in at least one of the two columns. For this reason, Gray coding is not needed and one can append ECC fields to each address, as shown. In the first format (FIG. 6A), the uncertainty is one track; in the second (FIG. 6B), the uncertainty is half a track. In seeking, one may recognize the column to be read by using a position error signal from the servo bursts which have a period of two tracks. For this use, the servo bursts should be positioned close to the track addresses so that the radial position of the read head 26 does not change significantly from the time the head is reading the servo burst and the time it is reading the track addresses.

MSB Detector and Chunk Synch for WBP Codes

The WBP servo information coding arrangement described above is advantageously employed within a PRML sampling data detection channel in that many circuit elements of the channel may be used for recovering the servo information. For example, a single read channel application-specific integrated circuit (ASIC) may include a small amount of additional circuitry thereby enabling the ASIC to detect coded user data symbols as well as WBP coded servo information symbols. For example, a path sequence detector, such as a Viterbi detector 60 (FIG. 12) may be employed to detect the WBP coded servo information, as described for example in commonly assigned, copending U.S. patent application Ser. No. 08/686, 998, filed on Jul. 24, 1996, entitled: "Wide Bi-phase Digital Servo Information and Estimation for Disk Drive Using Viterbi Detection", the disclosure thereof being incorporated herein by reference. Alternatively, the WBP coded servo information may be recovered by a "most-significant-bit" (MSB) detector within the synchronous data detection channel. In an MSB detector, a series of points are sampled along a signal. When a transition is detected, the channel decides whether the transition is a logical "1" or a logical "0". This may be determined by considering the most significant bit of the 2's complement of the sample point (e.g. 6 bit sample) and applying the following analysis:

$$\left\{ MSB = \begin{array}{l} 0 = \text{logical ``1''} \\ 1 = \text{logical ``0''} \end{array} \right\}$$

Figure 7:
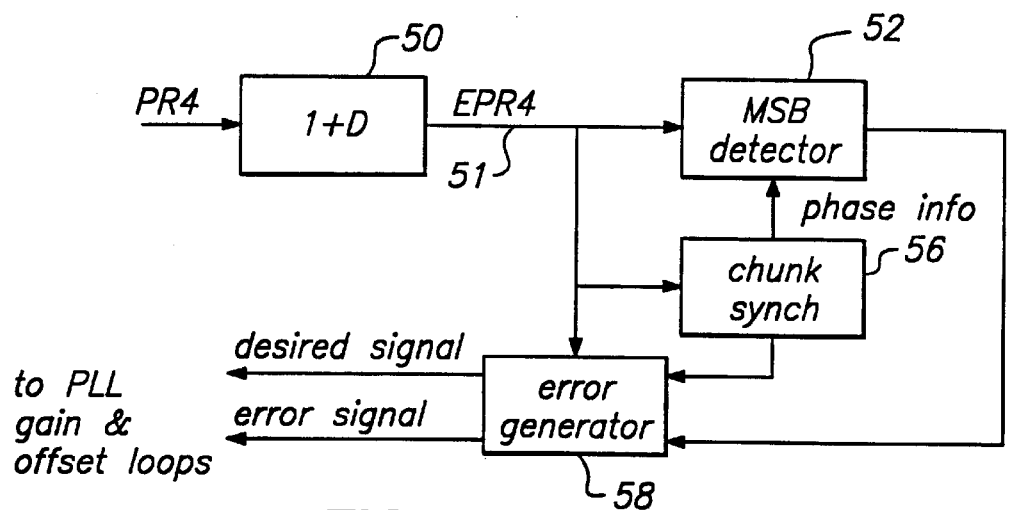
FIG. 7 is a block diagram of a portion of servo sector logic including a MSB detector, a chunk synchronizer, and an error generator.

Turning to FIG. 7, a most-significant-bit ("MSB") detector 52 for detecting wide bi-phase codes may be connected to receive an EPR4 target data stream from an output of a 1+D filter 50. Alternatively, the MSB detector 52 may be connected to the input of the 1+D filter 50 to receive a PR4 target data stream. MSB detector 52 uses phase information from chunk synchronizer 56 to decode WBP codes. The decoded data from MSB detector 52 is compared with raw data on filter 50 output path 51 in error generator 58 to generate error signals for the PLL, AGC and DC offset loops.

Figure 8:
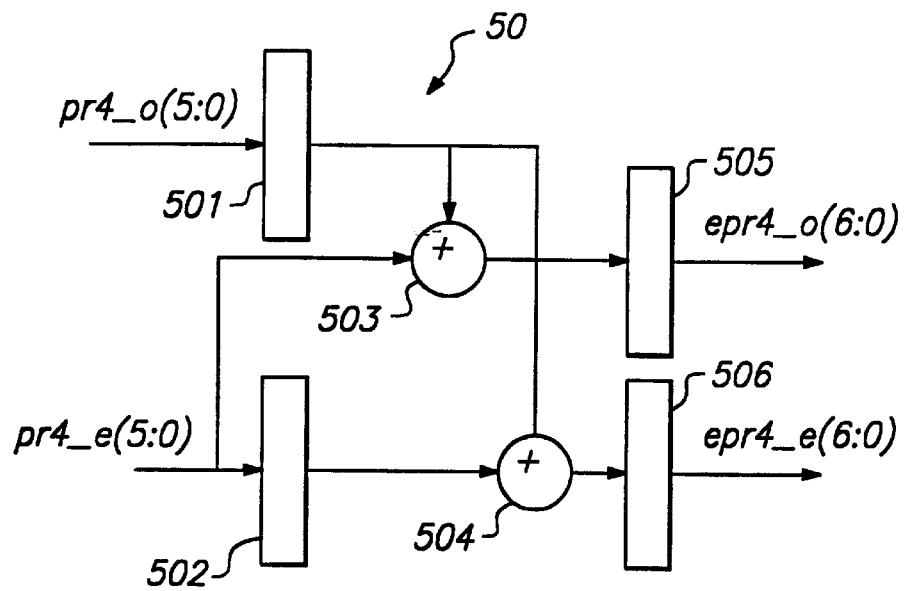
FIG. 8 is a block diagram of a 1+D filter.

Turning to FIG. 8, 1+D filter 50 is shown in otherwise superfluous detail to illustrate the technique of separating computations into even and odd parts that is used to realize the required sample processing bandwidth with minimum clock frequency. Filter 50 receives odd and even 6-bit samples, pr4_o[5:0] and pr4_e[5:0], respectively, from FIR filter 48. The samples are delayed at registers 501 and 502, as shown, and summed at adders 503 and 504, as shown, to produce 7-bit sums that are the odd and even EPR4 samples, epr4_o[6:0] and epr4_e[6:0], respectively, through buffer registers 505 and 506. Operating separately as it does with odd and even samples, filter 50 runs at 2T, half the channel clock rate.

Figure 9:
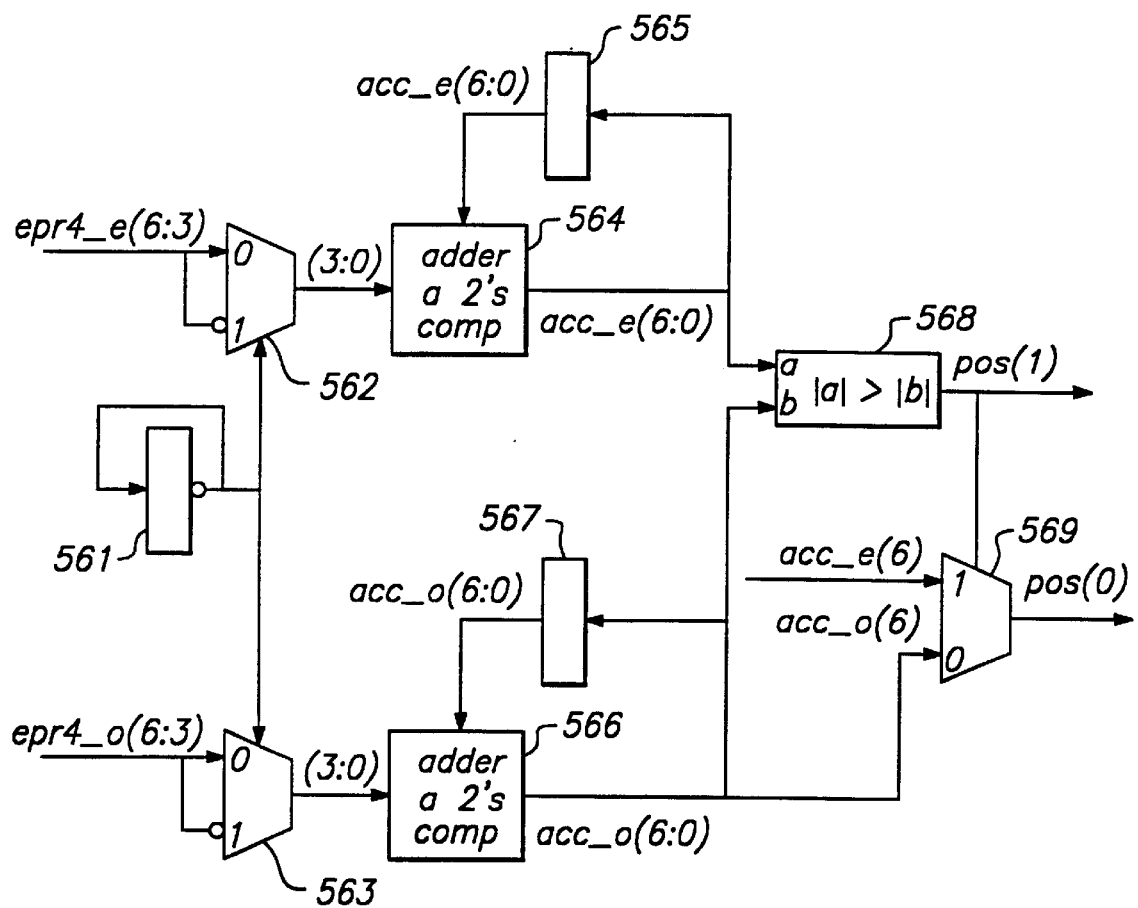
FIG. 9 is a block diagram of a chunk synchronizer.

Turning to FIG. 9, the chunk synchronizer 56 locks to the WBP symbols, that is, it locks to one of the four possible phases of the preamble sine wave (each phase is one cell apart). The chunk synchronizer 56 inputs the EPR4 waveform from 1+D filter 50 and chooses one of the four cells as the reference cell from which the MSB detector will make a decision and the error generator 58 will generate errors. To accomplish this, it multiplies the incoming EPR4 signal with two orthogonal reference signals for some window length, e.g. 12 cells and then accumulates the multiplied signals. The two orthogonal signals are, for example, in cell clock intervals, 1 0 –1 0 1 0 –1 0 . . . and
0 1 0 –1 0 1 0 –1 . . . .

Denoting the two accumulated values by acc_e and acc_o, for even and odd streams, respectively, the position of the phase of the preamble is estimated as follows:

pos[1]=|acc_e|>|acc_o|;
if (|acc_e|>|acc_o|) then
  pos[0]=sign (acc_e)
else
  pos[0]=sign (acc_o).

The two bits of position, pos[1:0], indicate the position of the '–' to '+' transitions in preamble. Recall that the preamble magnets (−−++ −−++ −−++ . . . ) may be thought of as a sequence of WBP-encoded 1's. Note that one cannot have a 0 sample in the middle of a WBP code series of multiple cells, i.e., a preamble field, because there is always a transition there. Thus, of the 5 ideal levels that can be sampled with an EPR4 target (e.g., –1, –½, 0, ½, 1), only two are possible in the middle of a WBP code: –1 and 1. Because of the repeated '−−' or '++' before the transition, –½ and ½ are also not possible there. Thus, the EPR4 samples in the preamble will include a stream of regularly spaced +1's whose position indicates the center of the WBP code. This position is indicated by pos[1:0]. In practice, servo data input to the MSB detector 52 is given a polarity sign during transformation into servo samples by the analog to digital converter 46.

The orthogonal reference signals ' . . . 1 0 –1 0 . . . ' are implemented by a register 561 connected to alternate between values 1 and 0 and multiplexers 562 and 563, which in response to the value from register 561, output either their normal or their inverted input, thus alternating between multiplying the samples by 1 and –1. The high order e.g. 4 bits epr4_e[6:3] of the even samples are input into the 0 input of multiplexer 562, and their inverse is input into the 1 input of the multiplexer. Similarly, the high order 4 bits epr4_o[6:3] of the odd samples are input into multiplexer 563. Adder 564 sums the even sequence acc_e using register 565 to accumulate the result. Similarly, adder 566 and register 567 accumulate acc_o. The absolute values of acc_e and acc_o are compared in comparator 568 to generate the bit pos[1], and that bit is also used to select in multiplexer 569 the value of bit pos[0], either the sign of acc_e (i.e., acc_e[6]) or the sign of acc_o.

Figure 10:
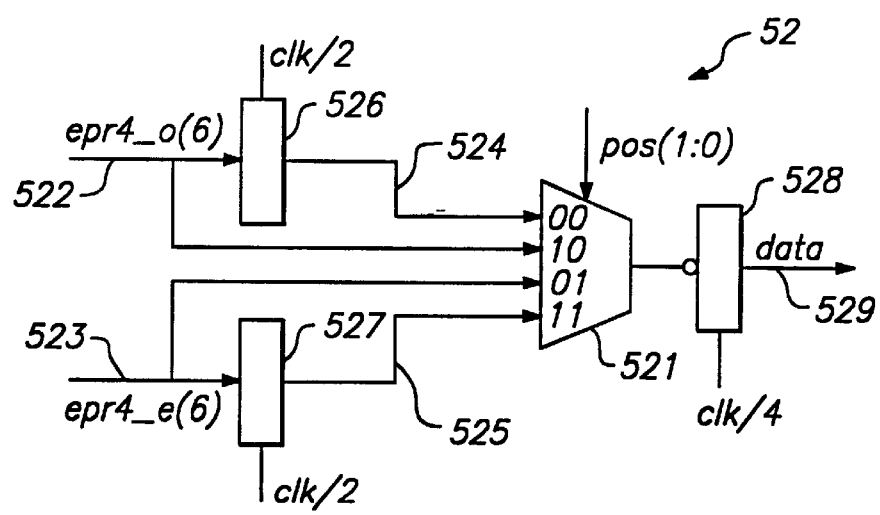
FIG. 10 is a block diagram of a MSB detector.

Turning to FIG. 10, MSB detector 52, multiplexer 521 uses pos[1:0] from chunk synchronizer 56 which estimates the location of the WBP code center, to select one of four consecutive samples' high order bits as the decoded value of the WBP symbol. These 4 bits are epr4_o[6] 522, epr4_o [6] delayed 2T 524, epr4_e[6] 523, and epr4_e[6] delayed 2T 525. The 2T delays are provided by registers 526 and 527, respectively, and these are clocked at half the cell rate. The inverted output of multiplexer 521 is provided through register 528, which is clocked at one-quarter the cell rate, to provide one decoded symbol every 4T.

In an alternative embodiment, the MSB detector of FIG. 10 can provide error information as well as MSB decoding. By expanding registers 526 and 527 and multiplexer 521 to accept the full sample values (rather than just the high order bits, as illustrated), the output at register 528 is the entire selected sample, and not just its high order bit. The high order bit is still used to provided the decoded WBP symbol, but the entire value may now be used to generate an error signal if the selected value is closer than a threshold value to zero. (Recall that with WBP coding, the noiseless sample value should be either a maximum or a minimum and never zero.)

It will be appreciated by those skilled in the art that the WBP code is polarity sensitive, in that a "1" is defined as −−++ and a "0" is defined as ++−−. If, for example, a head transducer is reversed in polarity in the wiring connections, preamble and chunk sync (which are not polarity sensitive) will be detected, but a correct SAM and other data fields will not be read correctly, because chunk synchronization will be 180 degrees out of phase and the magnitude of the data sample will be inverted. In order to protect against a reversed polarity read element, a flip bit control flag is used. In this situation, a control processor or state machine will time out after a number of failed attempts have been made to detect a correct SAM, whereupon the flip control bit is set and the SAM searching sequence is repeated. The flip control bit is input to the Chunk Sync and MSB detector functions. Logic to correct for the polarity flip is:

1. if FLIP, then phase pos[1:0]=0 is actually what appears to be phase pos [1:0]=2.
2. if FLIP, then invert the MSB of the data passed to the MSB-Detector.

Figure 11:
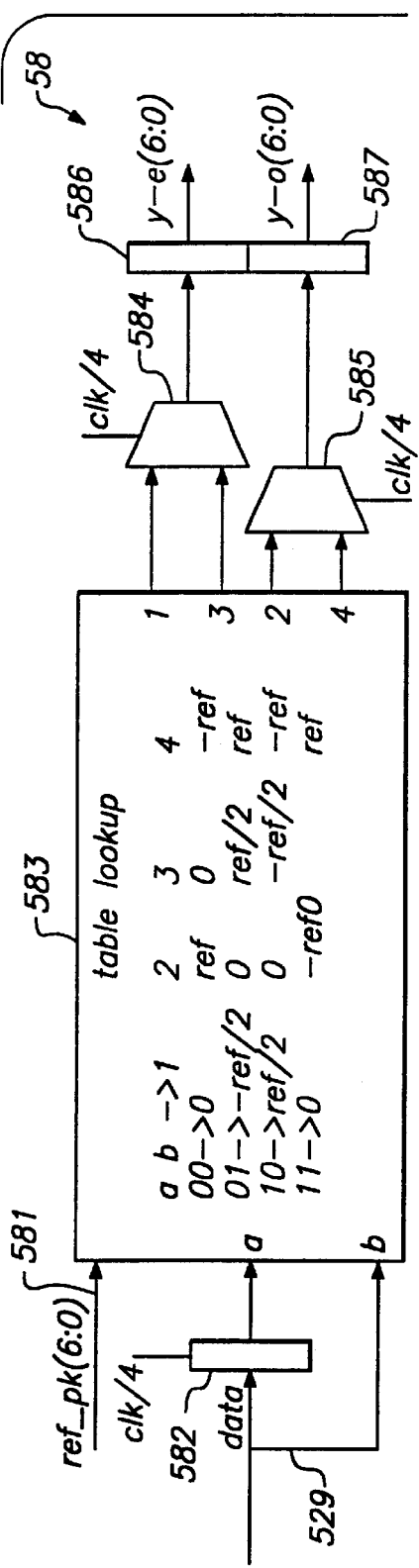
FIG. 11 is a block diagram of an error generator.
Figure 11:
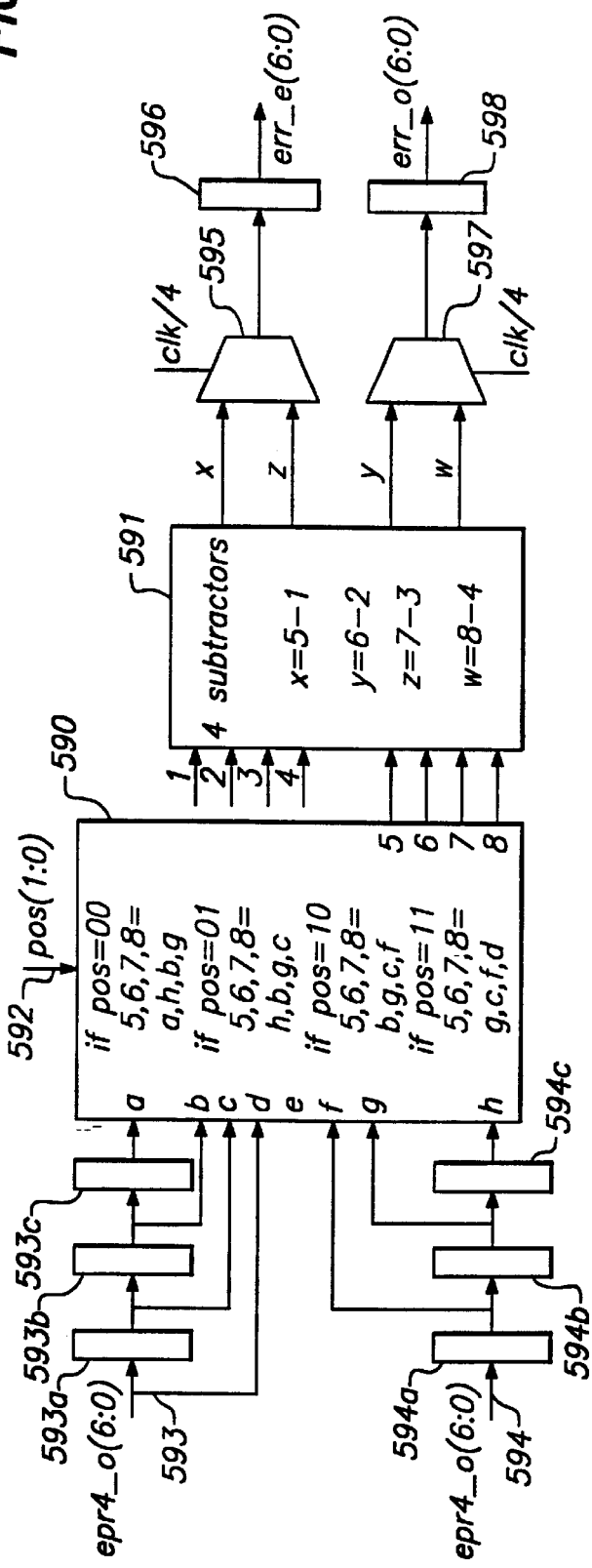

Turning to FIG. 11, error generator 58 first generates the ideal waveform from the output of MSB detector 52 and then subtracts that ideal waveform from the signal actually read to generate an error signal. The error signal and the ideal signal are used to update the phase detector, gain loop, and DC offset loop.

A pair of consecutive symbols decoded by MSB detector 52 are used as a two-bit index in lookup table 583 to select 4 values for the ideal EPR4 waveform, using ref_pk[6:0] at input 581 as the peak value of the ideal waveform. (The earlier of the pair of symbols is provided by register 582, which is clocked with the WBP period 4T.) The 4 values provided by lookup table 583 are tabulated below. (The peak value for the ideal waveform is shown as "r".)

| Current Symbol | Previous Symbol | Outputs | | | |
|---|---|---|---|---|---|
| | | 1 | 2 | 3 | 4 |
| 0 | 0 | 0 | r | 0 | −r |
| 1 | 0 | −r/2 | 0 | r/2 | r |
| 0 | 1 | r/2 | 0 | −r/2 | −r |
| 1 | 1 | 0 | −r | 0 | r |

The 4 values provided by table 583 for each symbol pair are selected by multiplexers 584 and 585, which select alternate inputs on a 4T period, to produce through registers 586 and 587 the ideal even and odd EPR4 waveforms, respectively. The 1, 2, 3 and 4 outputs of lookup table 583 are also the 1, 2, 3, and 4 inputs to a group of subtractors 591.

Multiplexer 590 uses chunk synchronization phase pos [1:0] to properly match EPR4 samples epr4_o[6:0] and epr4_e[6:0] from 1+D filter 50 to the ideal waveforms generated by use of lookup table 583, which has just been described. The odd EPR4 samples are provided undelayed at path 593 and are successively delayed 2T by registers 593a, 593b, and 593c, whose outputs are also provided to multiplexer 590 as shown. The even EPR4 samples are similarly provided at path 594 and through registers 594a, 594b, and 594c to multiplexer 590. The following table shows the outputs 5, 6, 7, and 8 of multiplexer 590 based on the phase pos[1:0] and the even and odd EPR4 sample values, denoted by y_e(k) and y_o(k). (The time index k increments in steps of 2T.)

| Phase | Outputs | | | |
|---|---|---|---|---|
| | 5 | 6 | 7 | 8 |
| 00 | y_o(k) | y_e(k) | y_o(k-1) | y_e(k-1) |
| 01 | y_e(k) | y_o(k-1) | y_e(k-1) | y_o(k-2) |
| 10 | y_o(k-1) | y_e(k-1) | y_o(k-2) | y_e(k-2) |
| 11 | y_e(k-1) | y_o(k-2) | y_e(k-2) | y_o(k-3) |

The ideal values from lookup table 583 are subtracted from the corresponding sample values from multiplexer 590, by subtractor group 591, as shown, so that the 1 output of table 583 is subtracted from the 5 output of multiplexer 590, the 2 output from the 6 output, and so on. The results of these subtractions are the error signals, which are buffered through multiplexers 595 and 597 at a 4T period (corresponding with the WBP symbol input rate to lookup table 583), and then buffered through registers 596 and 598 to provide a stream of even and odd error signals err_e[6:0] and err_o[6:0], respectively.

Figure 12:
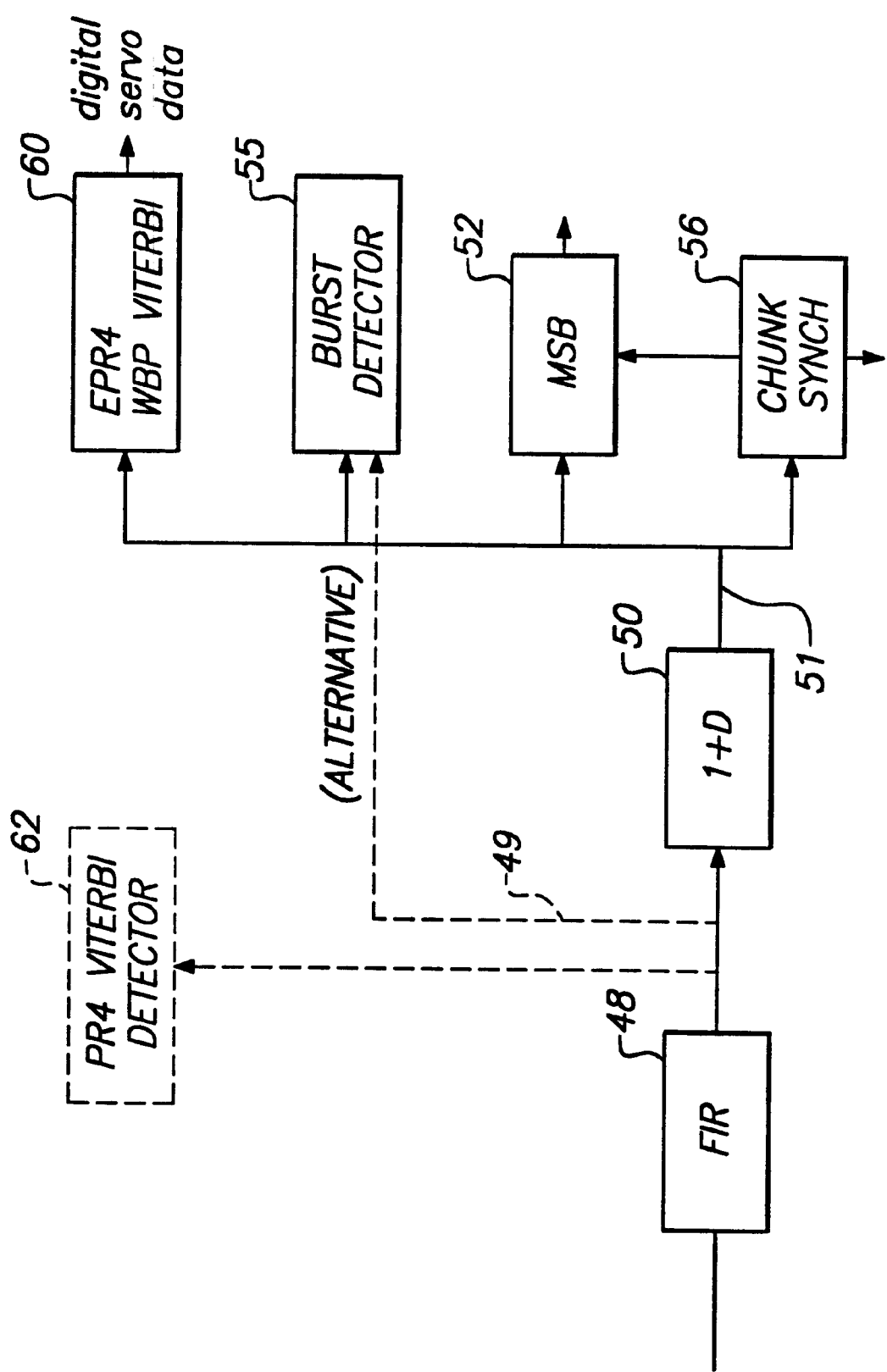
FIG. 12 is a block diagram showing a burst detector in the servo sector block diagram.

Turning to FIG. 12, a Viterbi detector 60 for PRML detection of WBP codes with EPR4 targets can be used to detect all VWBP-encoded digital information in the servo sector, such as track number, head number, and sector number. Viterbi detector 60 may be a difference-metric detector or a tree search detector, or a conventional Viterbi detector, as described in commonly assigned, copending U.S. patent application Ser. No. 08/686,998, filed on Jul. 24, 1996, and entitled: "Wide Bi-phase Digital Servo Information and Estimation for Disk Drive Using Viterbi Detection", the disclosure thereof being incorporated herein by reference. Alternatively, in place of an EPR4 detector, WBP-encoded data in the servo sector may be decoded by a Viterbi detector for WBP codes with PR4 targets, such as a difference-metric detector or a tree-search detector, or by a conventional Viterbi detector, also as described in the copending patent application referred to hereinabove.

Returning to FIG. 12, a digital servo burst detector 55 also receives the EPR4 target output signal from target filter 50. Alternatively, burst detector 55 may receive a PR4 target from the output of the FIR filter 48, where burst formats are used that can be detected with e.g. a PR4 target.

Turning to FIGS. 13A–13E, five servo burst formats will be described. The centers of the data tracks are indicated by TK0, TK1, TK2, and TK3. The bursts in each format repeat with a period of two servo tracks. The first format, which we will call the type I format, i.e. full track bursts, is illustrated diagrammatically in FIG. 13A. The type I bursts A, B, and C (and, optionally, D) are written to be the width of a data track. Because the write head is less than this wide, the bursts are written in at least two passes and at least one erase band (not shown) will be found within each burst. There is also an erase band (not shown), for example, between burst A and burst C, that runs along TK1.

Figure 13A:
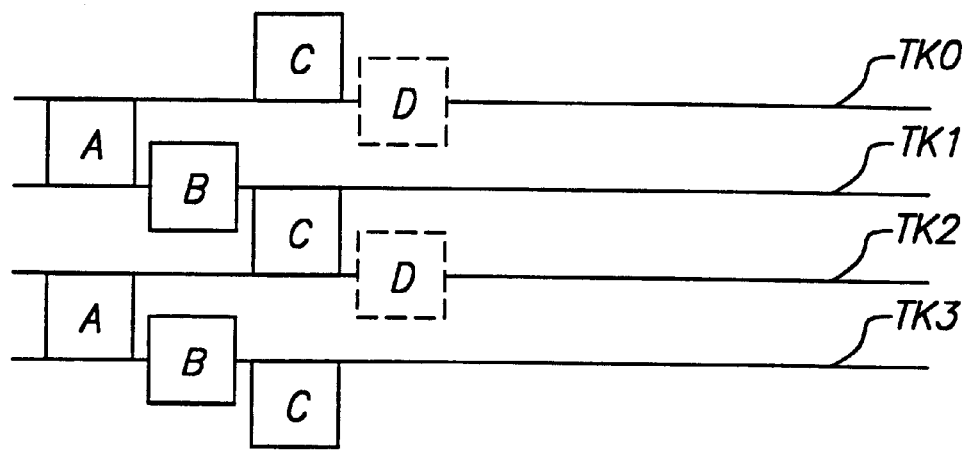
FIGS. 13A–13E are diagrams illustrating servo bursts formats.
Figure 13B:
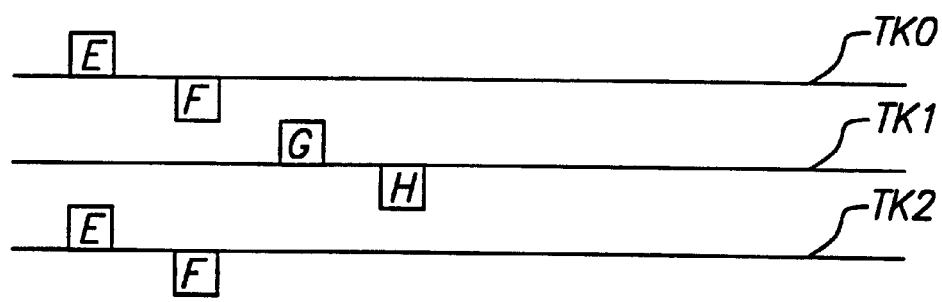

The second format, which we will call the type II format, i.e. narrow bursts, is illustrated diagrammatically in FIG. 13B. In this format, each burst, E, F, G, and H, is written only once; thus there is no erase band within the burst. The distance between radially adjacent bursts (such as E and F) is half a track width. The write head will generally exceed this width, so each burst will normally extend over one track center.

In both type I and type II formats, the bursts themselves are normally sinusoids of constant frequency and amplitude.

Figure 13C:
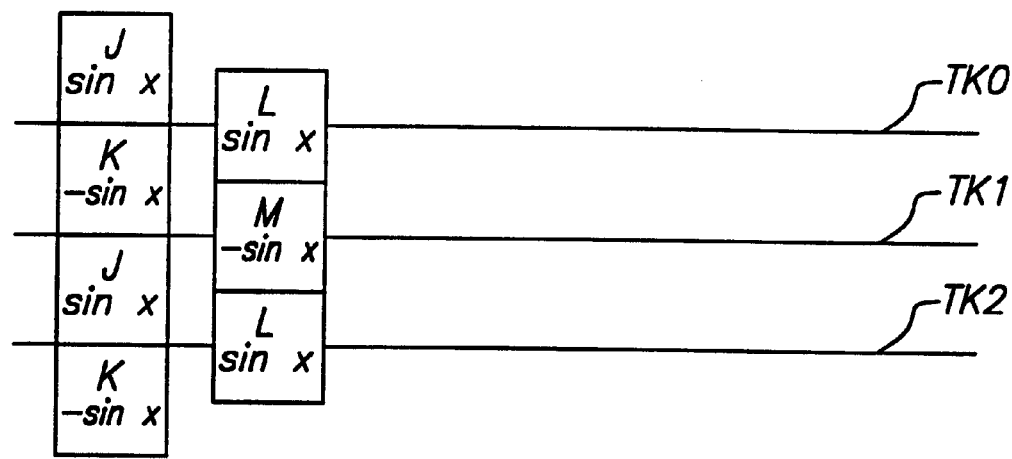

The third format, which we will call the antipodal format, is illustrated diagrammatically in FIG. 13C. In this format, the bursts—J, K, L, and M—are written to fill the space left blank, for example, between the A and B bursts in the type I format (FIG. 13A). The unrecorded areas are filled with a sinusoidal waveform of opposite (or antipodal) polarity. Thus, if the signal in burst J is sin(x), the signal in burst K is −sin(x). The waveforms in bursts L and M correspond to those of bursts J and K.

Unlike the situation with type I and type II, phase information is important in the antipodal format. Thus, the PLL sampling phase is locked and not updated while reading this burst format, so as not to "correct" the phase information. For the same reason, this format is subject to errors arising from the erase band within the bursts, radial phase incoherence, and accumulated phase error. To allow the disk drive to limit the effect of such errors, an optional resynchronization pattern (not shown) may be recorded before bursts themselves, as taught in the above-referenced, copending U.S. patent application Ser. No. 08/320,540 filed on Oct. 11, 1994, entitled: "Synchronous Detection of Concurrent Servo Bursts for Fine Head Position In Disk Drive", now U.S. Pat. No. 5,576,906, the disclosure thereof being incorporated herein by reference.

Figure 13D:
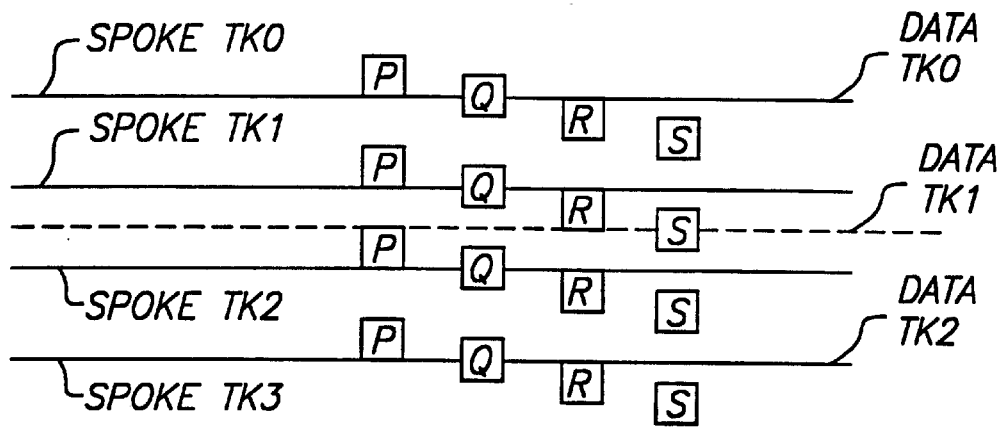

The fourth format, which we will call the compressed format, is illustrated diagrammatically in FIG. 13D. This format is like type I in form, with the difference that, unlike the situation with the other formats, in compressed format the servo information is written on spoke tracks SPOKE TK0, SPOKE TK1, SPOKE TK2, and SPOKE TK3 that do not correspond to the data tracks, which here are denoted DATA TK0, DATA TK1, and DATA TK2. Each burst P, Q, R, and S is written only once; thus there is no erase band within the bursts and the bursts are nevertheless the full width of the servo track. Note that with this format, in tracking an odd numbered data track, such as track DATA TK1, the disk drive will not be following a servo track center. In fact, the head will ideally be placed exactly between two servo tracks, and the two-track periodicity of the burst format must be used to resolve the track number ambiguity between the Gray coded numbers received from spoke tracks SPOKE TK1 and SPOKE TK2 while tracking data track DATA TK1, for example.

Figure 13E:
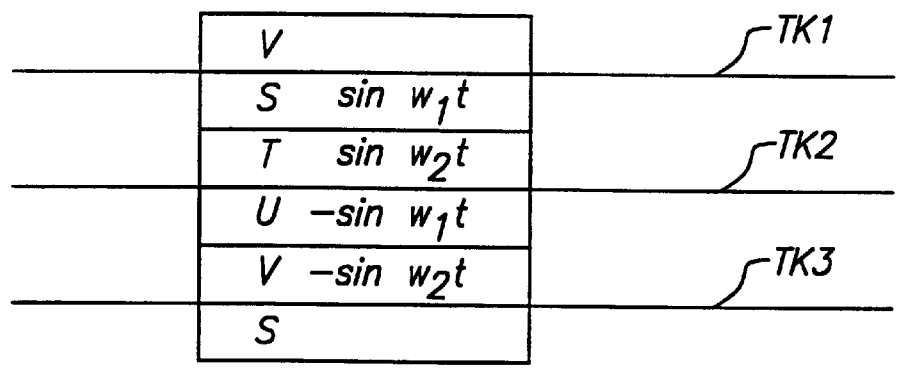

The fifth format, which we will call the frequency format, is illustrated diagrammatically in FIG. 13E. In this format, unlike the ones previously described, the burst waveforms are not all recorded at one frequency. The frequency format bursts are recorded across the full radial width of the half tracks. As illustrated in FIG. 19E, the radial sequence of bursts S, T, U, and V are recorded as sinusoids with angular frequencies w1 and w2, so that the form of the sequence of bursts is: S is sinw1t; T is sintw2; U is −sinw1t, and V is −sinw2t. The two frequencies must be different and should be selected to have no intersecting harmonics.

Figure 14A:
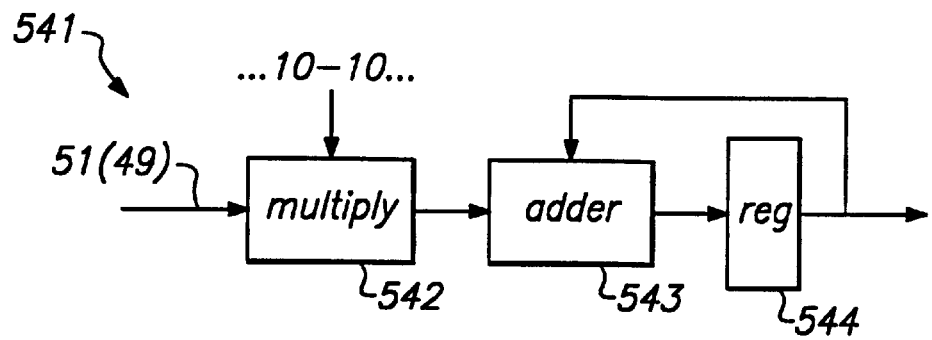
FIGS. 14A–14B are block diagrams of servo burst detectors.
Figure 14B:
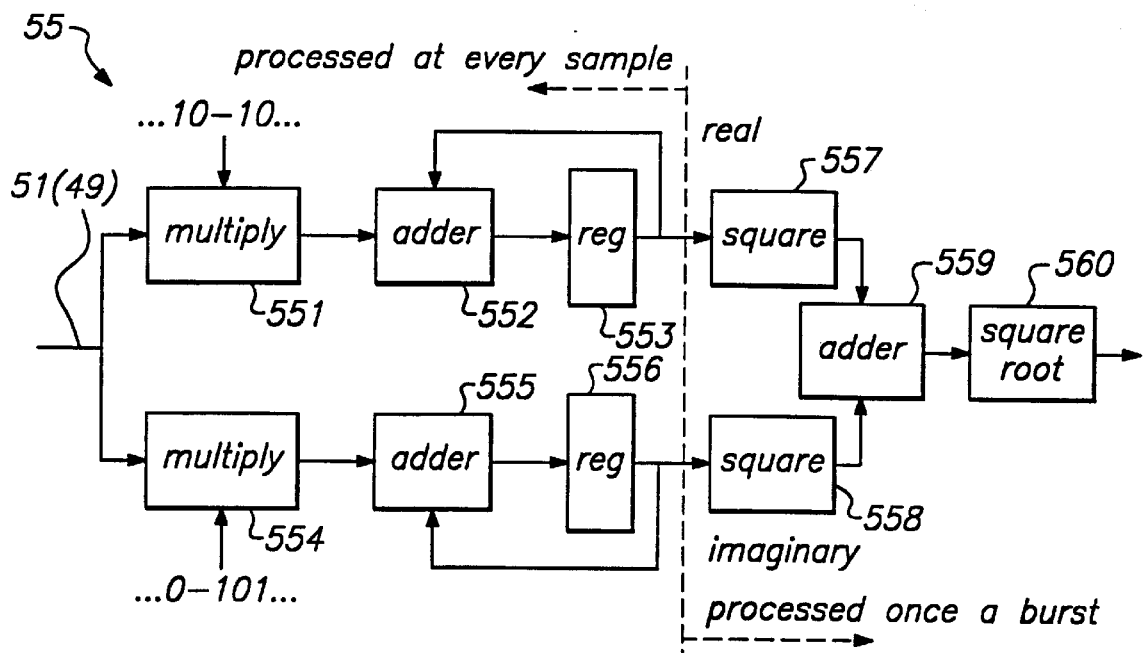

Turning to FIGS. 14A–14B, burst detector 54 will take different forms depending on the format in which the servo bursts are recorded. Turning to FIG. 14A, burst detector 541 is useful for synchronous formats such as the antipodal format and the frequency format. Multiplier 542 multiplies the EPR4 sample waveforms by a sine wave 1 0 −1 0. The result is accumulated by adder 543 in register 544. The output of the detector from register 544 represents the signed amplitude of the (generally) composite signal produced by two radially adjacent bursts, such as bursts K and J of FIG. 19C. This output will ideally be zero when the read head is exactly between the two bursts and on, for example, the track TK1.

Turning to FIG. 14B, burst detector 55 is useful for non-synchronous burst formats such as the type I, the type II, and the compressed formats. Burst detector 55 calculates a phase-amplitude vector of the burst signal by multiplying the EPR4 sample waveforms by two orthogonal sine waves with a phase offset of 90°; the first sine wave 1 0 −1 0 is used in multiplier 551, adder 552, and accumulating register 553; the second, orthogonal, sine wave 0 −1 0 1 is used in multiplier 554, adder 555, and accumulating register 556. The result of this process is a phase-amplitude vector whose real part is in register 553 and whose imaginary art is in register 556. When the burst has been read, the amplitude of the burst is calculated as the square root, circuit 560 of the sum, adder 559, of the squares of the real part, circuit 557, and the imaginary part, circuit 558, of the phase-amplitude vector. This calculated amplitude estimates the degree of overlap between the burst and the read head and is used later to estimate the head position with respect to the repeating two-track burst pattern. (Note than in the non-synchronous type I, type II, and compressed burst formats under consideration, no two bursts are radially adjacent, so the burst detector will have only one burst to process at a time.)

Figure 15A:
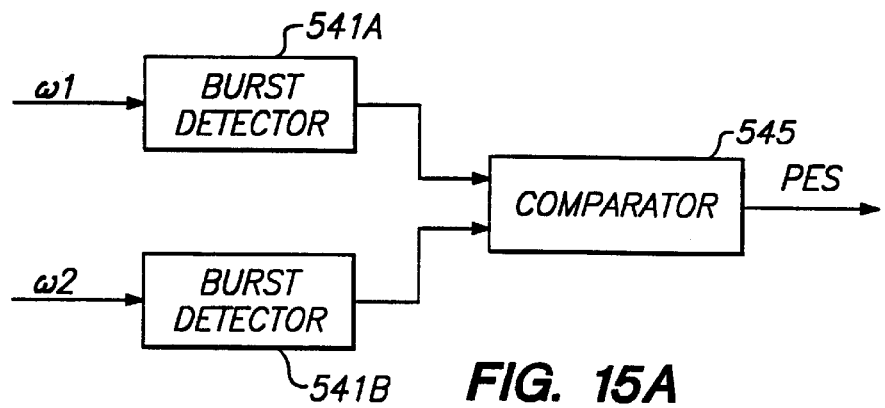
FIGS. 15A–15B are block diagrams of alternative servo burst detector architectures based on the FIGS. 14A, 14B approaches, respectively.

Two alternative burst detectors for the frequency format will now be described. The first alternative operates as a pair of the FIG. 14A burst detectors 541 as illustrated in FIG. 15A. The sine wave input to the first detector 541 A of the pair has an input to multiplier 542 which is a sine wave with an angular frequency of ω1. The second detector 541B has a sine wave input to its multiplier 542 at an angular frequency of ω2. The output of each detector 541A, 541B is the signed amplitude of the burst signal at the corresponding angular frequency, and these signed amplitudes are compared in a comparison circuit 545 to estimate the position of the read head.

Figure 15B:
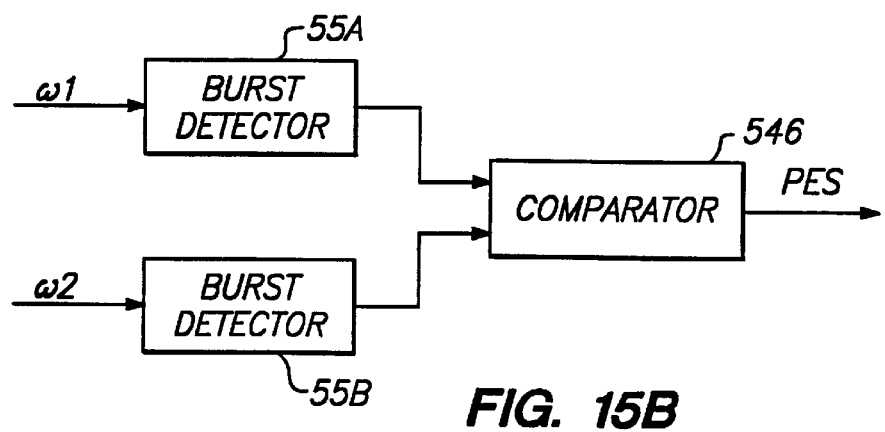

The second alternative burst detector for the frequency format, unlike the first alternative just described, is not sensitive to radial phase incoherence or phase error. The second alternative, shown in FIG. 15B, duplicates the operation of a pair of the burst detectors 55 illustrated in FIG. 14B. The sine wave input to multipliers 551 and 554 in the first of the pair of detectors 55A has an angular frequency of ω1. The sine wave input to the multipliers 551 and 554 of the second detector 55B has an angular frequency of ω2. The outputs of the two detectors 55A and 55B, each of which estimate the unsigned amplitude of the burst signal at the corresponding frequency, are compared by a comparison circuit 546 to estimate the position of the read head.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A disk drive comprising:
   at least one rotating data storage disk, the disk having a major surface defining recording tracks divided into data sectors by narrow servo spokes,
   a data sector of a recording track for recording with user data encoded in accordance with a code having a predetermined distance and user data code rate,
   a servo spoke of the recording area having at least one preamble field and at least one servo information field coded in a wide bi-phase pattern at a servo code rate which is one fourth the user data code rate,
   a synchronous sampling data detection channel including:
      a data transducer head positioned by a servo-controlled actuator over the recording track,
      a preamplifier for receiving electrical analog signals magnetically induced by the data transducer head from flux transitions present in at least the servo information field,
      a digital sampler for synchronously sampling the electrical analog signals to produce digital samples,
      a partial response filter for filtering the digital samples to a partial response class IV target spectrum to produce PR4 samples,
      a 1+D filter, D being a unit delay operator, connected to filter the PR4 samples to EPR4 target samples, and
   wide bi-phase decoding circuitry coupled to receive digital samples from the synchronous sampling data detection channel for decoding the coded wide bi-phase pattern, the wide bi-phase decoding circuitry including:
      a most significant bit detector connected to receive the EPR4 target samples and for detecting and putting out most significant bits as decoded wide bi-phase binary values, and,
      a chunk synchronizer connected to receive the EPR4 target samples and responsive to the preamble field for choosing one of four cells as a reference cell and for applying the reference cell as a wide bi-phase framing signal to the most significant bit detector for framing the wide bi-phase coded servo information field.

2. The disk drive set forth in claim 1 wherein the most significant bit detector includes circuitry responsive to a control signal for inverting polarity of decoded wide bi-phase pattern data.

3. The disk drive set forth in claim 1 wherein the wide bi-phase decoding circuitry further comprises an error generator circuit connected to the most significant bit detector, to the chunk synchronizer, and to receive the EPR4 target samples, for comparing the EPR4 target samples with the most significant bits in order to generate error signals.

4. The disk drive set forth in claim 3 wherein the synchronous sampling data detection channel further comprises a timing control loop for controlling timing of the digital sampler, and wherein the error signals are fed back to the timing control loop to correct for timing errors.

5. The disk drive set forth in claim 3 wherein the synchronous sampling data detection channel further comprises a variable gain amplifier and a gain control loop for controlling gain of the variable gain amplifier, and wherein the error signals are fed back to the gain control loop to correct for gain errors.

6. The disk drive set forth in claim 3 wherein the synchronous sampling data detection channel further comprises a DC offset adjustment circuit, and a DC offset control loop for controlling the DC offset adjustment circuit, and wherein the error signals are fed back to the DC offset control loop.

7. The disk drive set forth in claim 3 wherein the 1+D filter includes odd and even sample separation circuitry for separating the samples into EPR4 odd samples and EPR4 even samples.

8. The disk drive set forth in claim 7 wherein the chunk synchronizer includes:
   multiplying means for multiplying the incoming EPR4 odd samples by an odd orthogonal signal to produce an odd product, and for multiplying the incoming EPR4 even samples by an even orthogonal signal to produce an even product,
   accumulation means for accumulating the odd product over a predetermined cell window length to produce an odd accumulation acc_o, and for accumulating the even product over the predetermined cell window length to produce an even accumulation acc_e, and
   estimation means for estimating reference wide bi-phases of the preamble field in accordance with:
   pos[1]=|acc_e|>|acc_o|;
   if (|acc_e|>|acc_o|) then
      pos[0]=sign (acc_e)
   else
      pos[0]=sign (acc_e)
   wherein pos[1] estimates position of a − magnet, and pos[0] estimates position of a + magnet, in the preamble field, and for putting out a selection signal pos[1:0] to the most significant bit detector for marking a phase center of the wide bi-phase coded information in the servo information field.

9. The disk drive set forth in claim 8 wherein the most significant bit detector comprises:
   first register means clocked at a one-half clock rate for receiving the EPR4 odd samples and for latching every other EPR4 odd sample,
   second register means clocked at the one-half clock rate for receiving the EPR4 even samples and for latching every other EPR4 even sample,
   a first multiplexer means for receiving unlatched and latched EPR odd and even samples, the first multiplexer means being controlled by the selection signal pos[1:0] for selecting one received value as a decoded binary symbol from the servo information field, and
   third register means clocked at a one-quarter clock rate for holding and putting out the decoded binary symbol at a wide bi-phase decoded data rate.

10. The disk drive set forth in claim 9 wherein the wide bi-phase decoding circuitry further comprises an error generator circuit connected to the most significant bit detector, to the chunk synchronizer, and to receive the EPR4 target samples, for comparing the EPR4 target samples with the most significant bits in order to generate error signals, the error generator circuit comprising:
   a generator responsive to decoded binary symbols supplied from the third register means for generating ideal EPR4 waveforms,
   a second multiplexer means controlled by the selection signal pos[1:0] for receiving and matching in time actual EPR4 odd samples and EPR4 even samples from the 1+D filter with the ideal EPR4 waveforms, and,
   a subtractor circuit for differencing matched actual and ideal EPR4 values to produce the error signals.

11. The disk drive set forth in claim 10 wherein the error generator circuit further comprises third and fourth multiplexer means for separating the error signals into odd error signals err_o, and even error signals err_e, and fourth and fifth register means clocked at a one fourth clock rate for buffering and putting out the odd error signals err_o and even error signals err_e at the wide bi-phase decoded data rate.

12. A wide bi-phase detector within a synchronous sampling data detection channel, the detector for detecting wide bi-phase encoded servo symbols from servo sectors embedded within data sectors of a data track of a magnetic storage medium with which the channel is associated and comprising:
chunk synchronizer means connected to receive multi-bit digital samples from the data detection channel for generating a framing control signal for framing the digital samples into wide bi-phase servo symbols, and
a most significant bit detector means responsive to a most significant bit position of the multi-bit digital samples and to the framing control signal for decoding the wide bi-phase servo symbols into servo information symbols.

13. The wide bi-phase detector set forth in claim 12 wherein the most significant bit detector means includes means for 2s complementing each multi-bit digital sample and analyzing the most significant bit position such that a zero equals a servo symbol value of one and a one equals a servo symbol value of zero.

14. The wide bi-phase detector set forth in claim 12 further comprising flip bit means connected to the chunk synchronizer means and to the most significant bit detector means for reversing polarity of incoming multi-bit digital samples.

15. A synchronous servo pattern detector within a synchronous sampling data detection channel, the detector for synchronously detecting head fine position offset values read from a servo sector embedded within data sectors of a data track of a magnetic storage medium with which the channel is incorporated by a playback transducer, the servo sector comprising one of antipodal and frequency modulation servo burst pattern, the detector comprising:
a multiplier for multiplying synchronous samples of the servo burst pattern by a predetermined periodic angular function to produce a product,
an adder for accumulating the product, and
a register for holding the accumulated product.

16. A synchronous servo pattern detection architecture within a synchronous sampling data detection channel, the architecture for synchronously detecting head fine position offset values read from a servo sector embedded within data sectors of a data track of a magnetic storage medium with which the channel is incorporated by a playback transducer, the servo sector comprising one of antipodal and frequency modulation servo burst pattern having a first frequency $\omega 1$ and a second frequency $\omega 2$, the architecture comprising first and second servo pattern detectors, the first detector for receiving and decoding servo burst components at the first frequency $\omega 1$, and
the second detector for receiving and decoding servo burst components at the second frequency $\omega 2$,
the first and second detectors each comprising:
a multiplier for multiplying synchronous samples of the servo burst pattern by a predetermined periodic angular function to produce a product,
an adder for accumulating the product, and
a register for holding the accumulated product as an output; and,
and further comprising comparison means for comparing outputs of the first and second detectors to determine the head fine position offset values.

17. A synchronous servo pattern detector within a synchronous sampling data detection channel, the detector for synchronously detecting head fine position offset values read from a servo sector embedded within data sectors of a data track of a magnetic storage medium with which the channel is incorporated by a playback transducer, the servo sector comprising one of antipodal and frequency modulation servo burst pattern, the detector being insensitive to radial phase error and comprising:
a first detector section comprising:
a first multiplier for multiplying synchronous samples of the servo burst pattern by a first predetermined periodic angular function to produce a first product,
a first adder for accumulating the first product,
a first register for holding the accumulated first product, and
a first squaring circuit for periodically squaring the accumulated first product,
a second detector section comprising:
a second multiplier for multiplying synchronous samples of the servo burst pattern by a second predetermined periodic angular function to produce a second product,
a second adder for accumulating the second product,
a second register for holding the accumulated second product, and
a second squaring circuit for periodically squaring the accumulated second product,
an adder circuit for combining the squared accumulated first product and the squared accumulated second product to produce a position error sum, and
a square root circuit for obtaining a square root of the position error sum.

18. A synchronous servo pattern detector architecture within a synchronous sampling data detection channel, the architecture for synchronously detecting head fine position offset values read from a servo sector embedded within data sectors of a data track of a magnetic storage medium with which the channel is incorporated by a playback transducer, the servo sector comprising one of antipodal and frequency modulation servo burst pattern having a first frequency $\omega 1$ and a second frequency $\omega 2$, the architecture comprising first and second servo pattern detectors, the first and second servo pattern detectors being insensitive to radial phase error,
the first servo pattern detector for receiving the first frequency $\omega 1$ and including:
a first detector section comprising:
a first multiplier for multiplying synchronous samples of the servo burst pattern by a first predetermined periodic angular function to produce a first product,
a first adder for accumulating the first product,
a first register for holding the accumulated first product, and
a first squaring circuit for periodically squaring the accumulated first product,
a second detector section comprising:
a second multiplier for multiplying synchronous samples of the servo burst pattern by a second predetermined periodic angular function to produce a second product,
a second adder for accumulating the second product,
a second register for holding the accumulated second product, and
a second squaring circuit for periodically squaring the accumulated second product, an adder circuit for combining the squared accumulated first product and the squared accumulated second product to produce a position error sum, and a square root circuit for obtaining and putting out a square root of the position error sum for the ω1 frequency;

the second servo pattern detector for receiving the second frequency ω2 and including:

a first detector section comprising:

a first multiplier for multiplying synchronous samples of the servo burst pattern by a first predetermined periodic angular function to produce a first product, a first adder for accumulating the first product, a first register for holding the accumulated first product, and a first squaring circuit for periodically squaring the accumulated first product, a second detector section comprising:

a second multiplier for multiplying synchronous samples of the servo burst pattern by a second predetermined periodic angular function to produce a second product, a second adder for accumulating the second product, a second register for holding the accumulated second product, and a second squaring circuit for periodically squaring the accumulated second product, an adder circuit for combining the squared accumulated first product and the squared accumulated second product to produce a position error sum, and a square root circuit for obtaining and putting out a square root of the position error sum for the ω2 frequency; and comparison means for comparing the square roots of ω1 and ω2 frequencies to produce the head fine position offset values.

19. A data recording disk having a pattern of radially spaced tracks and a plurality of circumferentially spaced angular servo sectors lying in data sectors and having prerecorded servo head positioning information for identifying track and sector locations, each of the servo sectors having at least one identification field including servo symbols encoded in accordance with a wide bi-phase code, and wherein each of the data sectors is recorded with data symbols in accordance with a maximum distance code, such that the servo symbols and the data symbols may be read by a data transducer flying relative to the disk and detected upon passage through a synchronous sampling data detection channel of a disk drive including the disk and transducer.

20. The data recording disk set forth in claim 19 wherein the channel comprises a partial response, maximum likelihood sampling data detection channel.

21. The data recording disk set forth in claim 20 wherein the channel includes an equalizer means for equalizing the channel response to a partial response, class IV, target (PR4).

22. The data recording disk set forth in claim 20 wherein the channel includes equalizer means for equalizing the channel response to an extended partial response, class IV, target (EPR4).

23. The data recording disk set forth in claim 19 wherein magnet patterns comprising the wide bi-phase code are ++-- for a binary zero information value and --++ for a binary one information value, and wherein the synchronous sampling data detection channel synchronously samples the magnet patterns and includes a detector for converting the samples into binary zero information and binary one information.

24. The data recording disk set forth in claim 23 wherein the detector is a most significant bit detector.

* * * * *